United States Patent
Sanchez et al.

(10) Patent No.: US 11,644,997 B2
(45) Date of Patent: May 9, 2023

(54) RELEASING DATA STORAGE TRACKS WHILE MAINTAINING LOGICAL CORRUPTION PROTECTION

(71) Applicant: International Business Machines Corporation, Armonk, NY (US)

(72) Inventors: Matthew Sanchez, Tucson, AZ (US); Theresa Mary Brown, Tucson, AZ (US); Nedlaya Yazzie Francisco, Tucson, AZ (US); Nicolas Marc Clayton, Warrington (GB); David Brent Schreiber, Tucson, AZ (US); Mark L. Lipets, Tucson, AZ (US); Jared Michael Minch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/987,080

(22) Filed: Aug. 6, 2020

(65) Prior Publication Data

US 2022/0043573 A1 Feb. 10, 2022

(51) Int. Cl.
  *G06F 3/06* (2006.01)
(52) U.S. Cl.
  CPC ............ *G06F 3/065* (2013.01); *G06F 3/0644* (2013.01); *G06F 3/0673* (2013.01)
(58) Field of Classification Search
  CPC ....... G06F 3/065; G06F 3/0644; G06F 3/0673
  See application file for complete search history.

(56) References Cited

U.S. PATENT DOCUMENTS

| | | | |
|---|---|---|---|
| 8,028,135 B1 | 9/2011 | Manley et al. | |
| 9,135,120 B1 | 9/2015 | Natanzon | |
| 10,528,256 B2 | 1/2020 | Brown et al. | |
| 2004/0049697 A1* | 3/2004 | Edwards, Jr. | H04L 63/105 726/4 |
| 2008/0256314 A1* | 10/2008 | Anand | G06F 11/1451 711/162 |
| 2017/0060918 A1* | 3/2017 | Iyer | G06F 3/0665 |
| 2017/0316029 A1 | 11/2017 | Shah et al. | |
| 2019/0391739 A1 | 12/2019 | Mueller et al. | |
| 2020/0117749 A1 | 4/2020 | Ward et al. | |
| 2021/0397519 A1* | 12/2021 | Wilcock | G06F 11/1446 |

OTHER PUBLICATIONS

International Search Report and Written Opinion from PCT Application No. PCT/EP2021/070561, dated Nov. 11, 2021.
Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Zhuo H Li
(74) *Attorney, Agent, or Firm* — Zilka-Kotab, P.C.

(57) ABSTRACT

A computer-implemented method according to one aspect includes receiving an indication of a track range to be released within a storage volume; identifying a data backup within a backup storage space for the storage volume that corresponds to the track range; and releasing the track range within the storage volume in response to determining that the corresponding data backup has expired within the backup storage space.

25 Claims, 9 Drawing Sheets

(56) References Cited

OTHER PUBLICATIONS

Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.

* cited by examiner

RELEASING DATA STORAGE TRACKS WHILE MAINTAINING LOGICAL CORRUPTION PROTECTION

BACKGROUND

The present invention relates to implementing logical corruption protection (LCP) for data, and more particularly, this invention relates to releasing data storage tracks while maintaining LCP.

In order to implement logical corruption protection (LCP) for data within a storage volume, a backup storage space may be created and used to store backups of data from the storage volume. For example, point-in-time snapshots of predetermined data within the storage volume may be created and may be stored within the backup storage space. These data backups may be used to restore data within the storage volume that is lost or corrupted.

Additionally, a space release utility may be run on the storage volume to identify tracks of the storage volume that are not currently being used and that can be released for future data storage. This may increase the available usable capacity of the storage system by repurposing unused portions of the storage volume.

However, tracks stored within the storage volume may be relied upon by the data backups to restore data within the storage volume in response to data loss/corruption. If one or more of these tracks are released in response to a command from the space release utility, any associated data backups that rely on those tracks may no longer be able to restore data within the storage volume. This may result in data loss/corruption in the storage volume that cannot be resolved via LCP.

BRIEF SUMMARY

A computer-implemented method according to one aspect includes receiving an indication of a track range to be released within a storage volume; identifying a data backup within a backup storage space for the storage volume that corresponds to the track range; and releasing the track range within the storage volume in response to determining that the corresponding data backup has expired within the backup storage space.

In this way, data scheduled for removal from a storage volume via a track release from the storage volume may only be removed when all backups that rely on that data have expired within the backup storage space. This may ensure that all backups within the backup storage space have all associated data available within the storage volume to perform a data restoration if necessary. This may maintain a security of data within the storage volume according to an LCP implementation.

In one aspect, the backup storage space is created as part of a logical corruption protection (LCP) implementation for data within the storage volume.

According to another aspect, a computer program product for releasing data storage tracks while maintaining logical corruption protection includes a computer readable storage medium having program instructions embodied therewith, where the computer readable storage medium is not a transitory signal per se, and where the program instructions are executable by a processor to cause the processor to perform a method including receiving, by the processor, an indication of a track range to be released within a storage volume; identifying, by the processor, a data backup within a backup storage space for the storage volume that corresponds to the track range; and releasing, by the processor, the track range within the storage volume in response to determining that the corresponding data backup has expired within the backup storage space.

In one aspect, an indication of the track range to be released within the storage volume is stored within a space release bitmap (SRBM). In this way, track ranges may be released asynchronously (e.g., at a time later than the time the indication is received, etc.).

According to another aspect, a system includes a processor; and logic integrated with the processor, executable by the processor, or integrated with and executable by the processor, where the logic is configured to receive an indication of a track range to be released within a storage volume; identify a data backup within a backup storage space for the storage volume that corresponds to the track range; and release the track range within the storage volume in response to determining that the corresponding data backup has expired within the backup storage space.

In this way, by ensuring that LCP is implemented for the storage volume during track range release, the storage volume may be protected from logical corruption, which may improve a performance of the storage volume itself. Further, freeing up extents within the storage volume may reduce an amount of used space within the storage volume, which may improve a performance of the storage volume (e.g., if the storage volume is thin provisioned, etc.).

In one aspect, a data backup within the backup storage space is identified as corresponding to the track range in response to determining that the data backup relies on one or more tracks within the track range in order to perform a data restoration for the storage volume.

According to another aspect, a computer-implemented method includes receiving an indication of a track range to be released within a storage volume; storing an indication of the track range to be released within the storage volume within a space release bitmap (SRBM); identifying a data backup within a backup storage space for the storage volume that corresponds to the track range in response to determining that the data backup relies on one or more tracks within the track range in order to perform a data restoration for the storage volume; and releasing the track range within the storage volume in response to receiving an indication from the backup storage space that the corresponding data backup has expired within the backup storage space.

According to another aspect, a computer program product for releasing data storage tracks while maintaining logical corruption protection includes a computer readable storage medium having program instructions embodied therewith, where the computer readable storage medium is not a transitory signal per se, and where the program instructions are executable by a processor to cause the processor to perform a method including receiving, by the processor, an indication of a track range to be released within a storage volume; storing, by the processor, an indication of the track range to be released within the storage volume within a space release bitmap (SRBM); identifying, by the processor, a data backup within a backup storage space for the storage volume that corresponds to the track range in response to determining that the data backup relies on one or more tracks within the track range in order to perform a data restoration for the storage volume; and releasing, by the processor, the track range within the storage volume in response to receiving an indication from the backup storage space that the corresponding data backup has expired within the backup storage space.

Other aspects and embodiments of the present invention will become apparent from the following detailed description, which, when taken in conjunction with the drawings, illustrate by way of example the principles of the invention.

DETAILED DESCRIPTION

Figure 1:
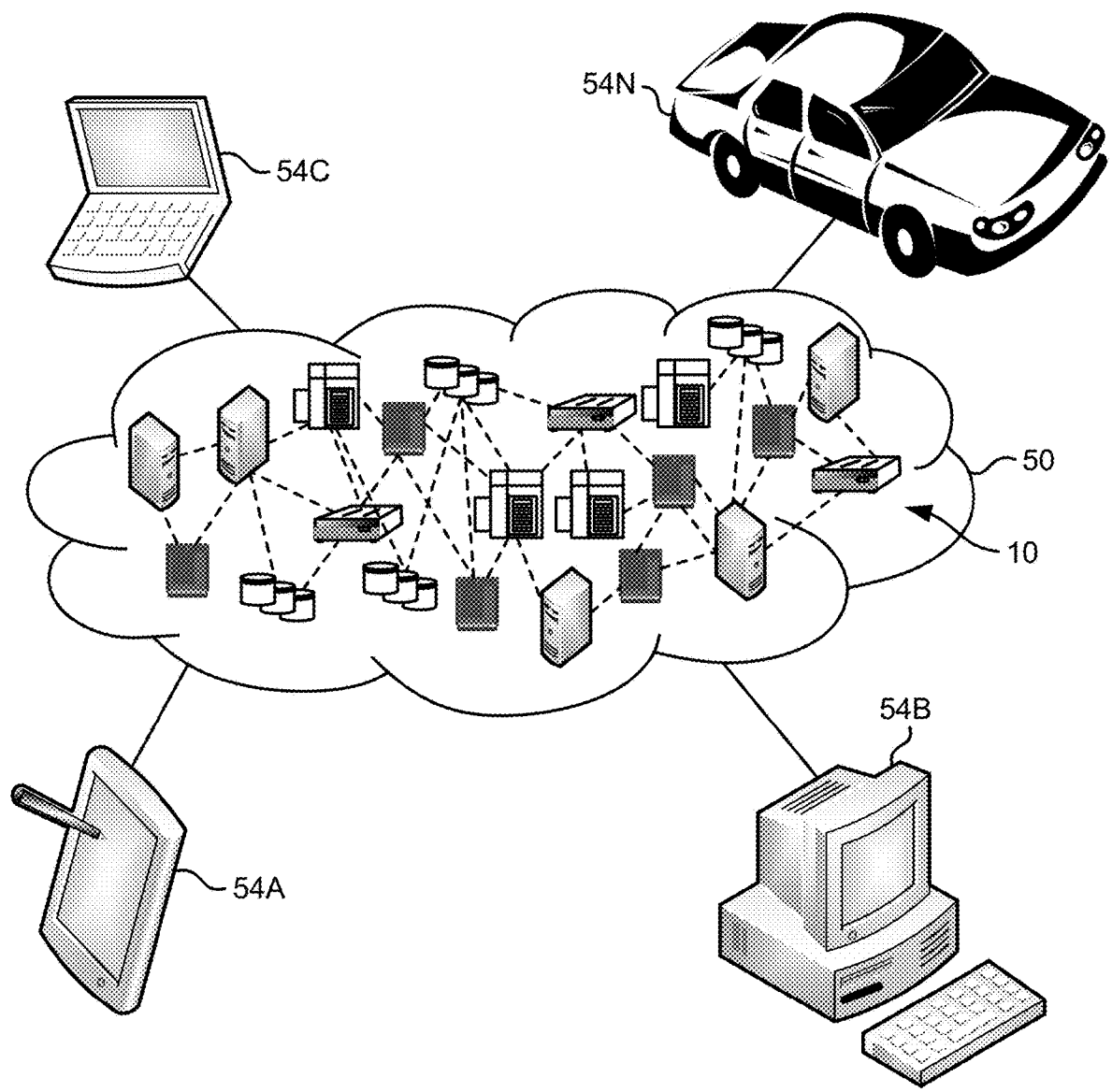
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of releasing data storage tracks while maintaining logical corruption protection.

In one general aspect, a computer-implemented method includes receiving an indication of a track range to be released within a storage volume; identifying a data backup within a backup storage space for the storage volume that corresponds to the track range; and releasing the track range within the storage volume in response to determining that the corresponding data backup has expired within the backup storage space.

In this way, data scheduled for removal from a storage volume via a track release from the storage volume may only be removed when all backups that rely on that data have expired within the backup storage space. This may ensure that all backups within the backup storage space have all associated data available within the storage volume to perform a data restoration if necessary. This may maintain a security of data within the storage volume according to an LCP implementation.

In one general aspect, the backup storage space is created as part of a logical corruption protection (LCP) implementation for data within the storage volume.

According to another general aspect, a computer program product for releasing data storage tracks while maintaining logical corruption protection includes a computer readable storage medium having program instructions embodied therewith, where the computer readable storage medium is not a transitory signal per se, and where the program instructions are executable by a processor to cause the processor to perform a method including receiving, by the processor, an indication of a track range to be released within a storage volume; identifying, by the processor, a data backup within a backup storage space for the storage volume that corresponds to the track range; and releasing, by the processor, the track range within the storage volume in response to determining that the corresponding data backup has expired within the backup storage space.

In one general aspect, an indication of the track range to be released within the storage volume is stored within a space release bitmap (SRBM). In this way, track ranges may be released asynchronously (e.g., at a time later than the time the indication is received, etc.).

According to another general aspect, a system includes a processor; and logic integrated with the processor, executable by the processor, or integrated with and executable by the processor, where the logic is configured to receive an indication of a track range to be released within a storage volume; identify a data backup within a backup storage space for the storage volume that corresponds to the track range; and release the track range within the storage volume in response to determining that the corresponding data backup has expired within the backup storage space.

In this way, by ensuring that LCP is implemented for the storage volume during track range release, the storage volume may be protected from logical corruption, which may improve a performance of the storage volume itself. Further, freeing up extents within the storage volume may reduce an amount of used space within the storage volume, which may improve a performance of the storage volume (e.g., if the storage volume is thin provisioned, etc.).

In one general aspect, a data backup within the backup storage space is identified as corresponding to the track range in response to determining that the data backup relies on one or more tracks within the track range in order to perform a data restoration for the storage volume.

According to another general aspect, a computer-implemented method includes receiving an indication of a track range to be released within a storage volume; storing an indication of the track range to be released within the storage volume within a space release bitmap (SRBM); identifying a data backup within a backup storage space for the storage volume that corresponds to the track range in response to determining that the data backup relies on one or more tracks within the track range in order to perform a data restoration for the storage volume; and releasing the track range within the storage volume in response to receiving an indication from the backup storage space that the corresponding data backup has expired within the backup storage space.

According to another aspect, a computer program product for releasing data storage tracks while maintaining logical corruption protection includes a computer readable storage medium having program instructions embodied therewith, where the computer readable storage medium is not a transitory signal per se, and where the program instructions are executable by a processor to cause the processor to perform a method including receiving, by the processor, an indication of a track range to be released within a storage volume; storing, by the processor, an indication of the track range to be released within the storage volume within a space release bitmap (SRBM); identifying, by the processor, a data backup within a backup storage space for the storage volume that corresponds to the track range in response to determining that the data backup relies on one or more tracks within the track range in order to perform a data restoration for the storage volume; and releasing, by the processor, the track range within the storage volume in response to receiving an indication from the backup storage space that the corresponding data backup has expired within the backup storage space.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
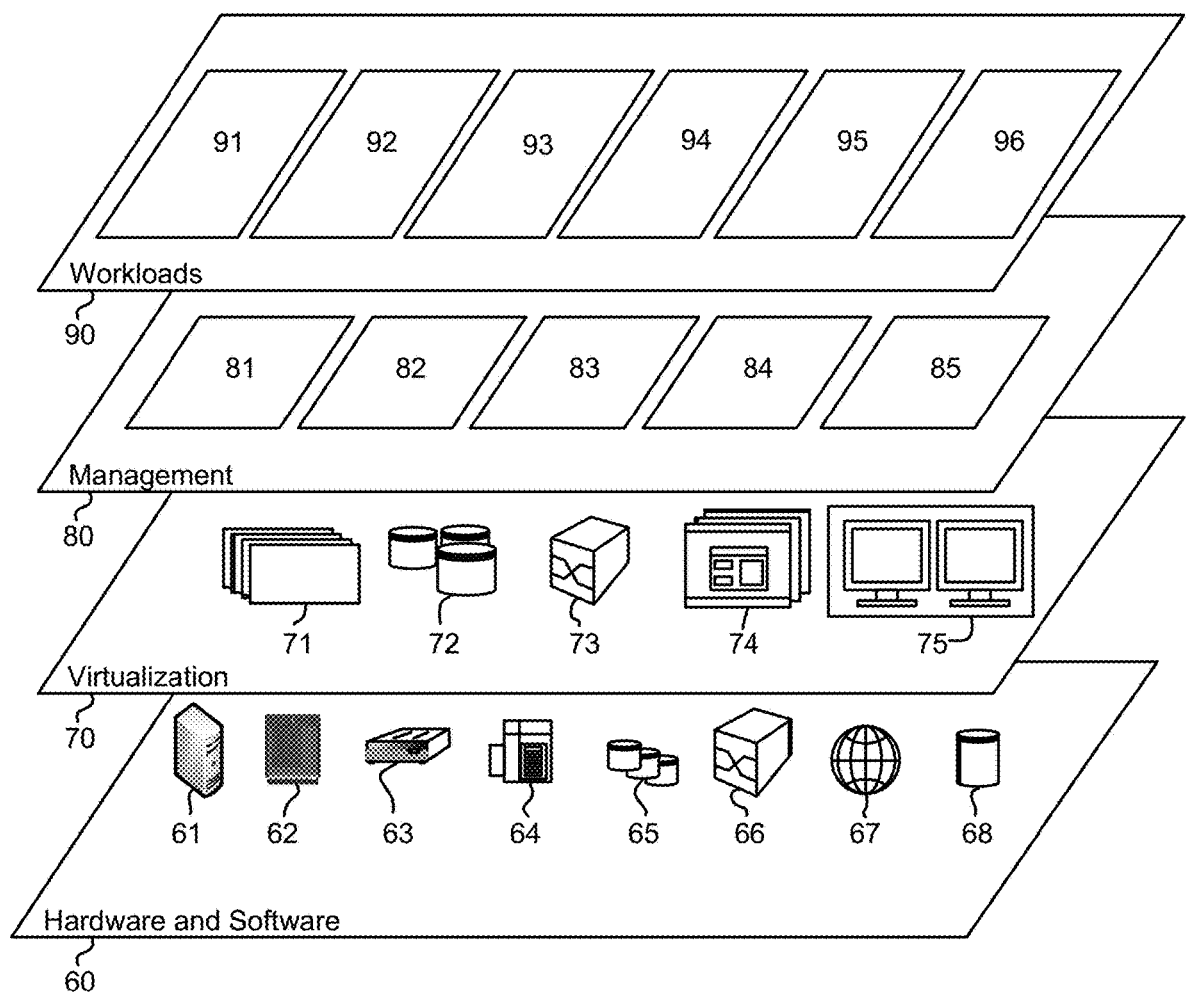
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and logical corruption protection (LCP) 96.

Figure 3:
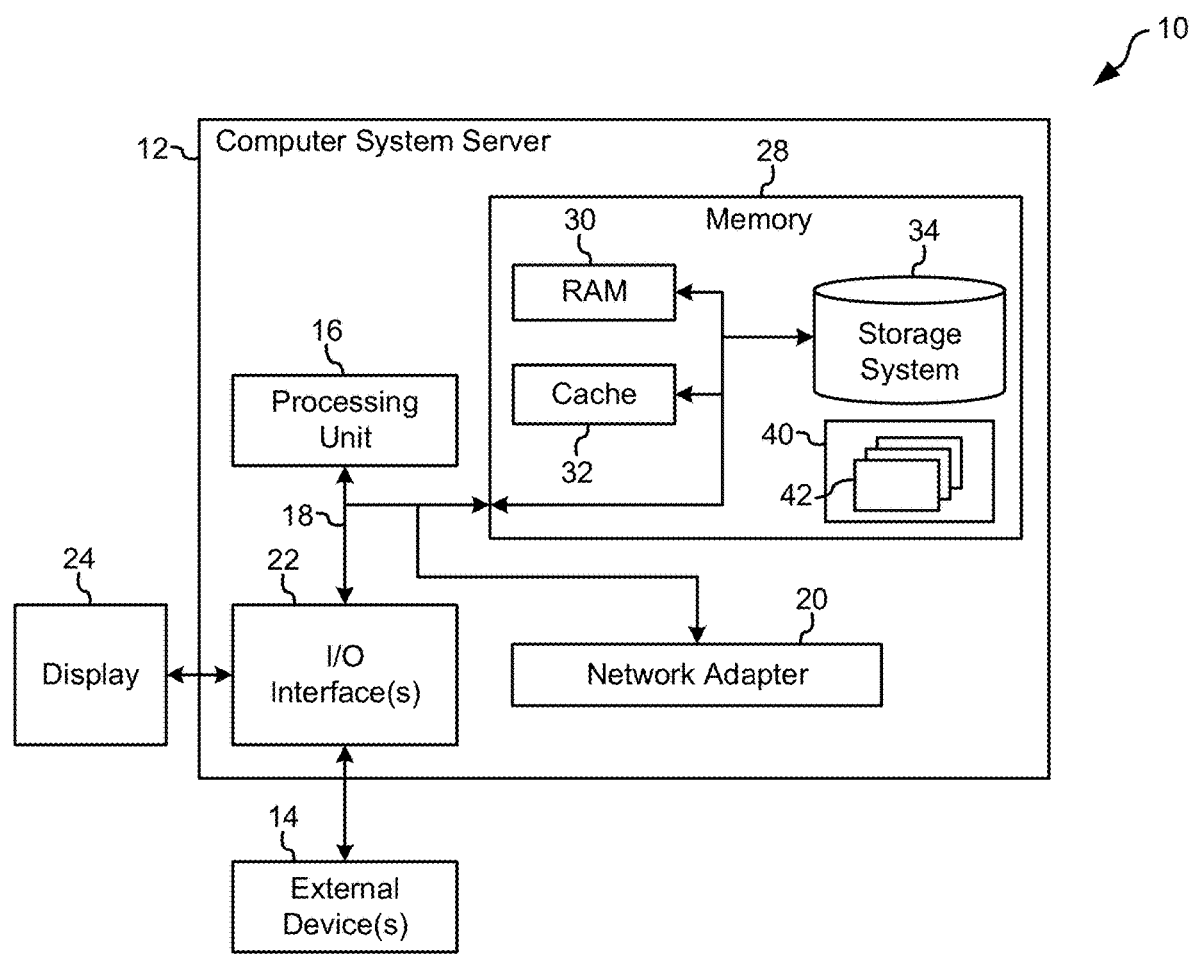
FIG. 3 depicts a cloud computing node in accordance with one aspect of the present invention.

Referring now to FIG. 3, a schematic of an example of a cloud computing node is shown. Cloud computing node 10 is only one example of a suitable cloud computing node and is not intended to suggest any limitation as to the scope of use or functionality of aspects of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of aspects of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of aspects of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
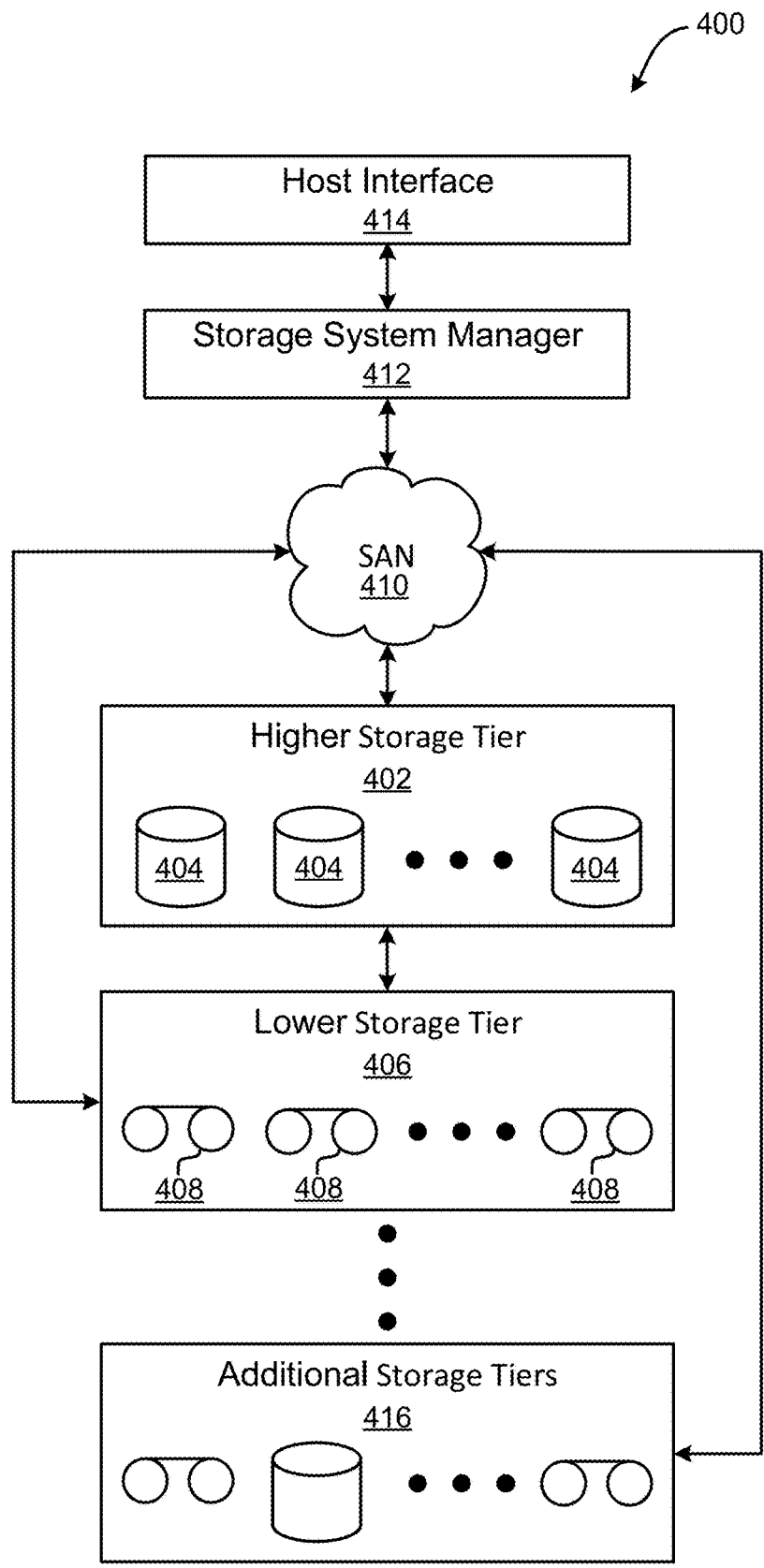
FIG. 4 illustrates a tiered data storage system in accordance with one aspect of the present invention.

Now referring to FIG. 4, a storage system 400 is shown according to one aspect. Note that some of the elements shown in FIG. 4 may be implemented as hardware and/or software, according to various aspects. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the aspects presented herein.

According to some aspects, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various aspects.

Logical Data Corruption

In one aspect, logical data corruption occurs when data storage hardware is intact and working correctly, but stored data is destroyed and/or corrupted on a content level. This may occur as a result of intentional or unintentional data deletion, encryption, and manipulation. For instance, logical data corruption may result from application corruption due to user error, inadvertent or malicious destruction of data, ransomware implementation where data might be encrypted without permission, etc.

In order to address logical data corruption, logical corruption protection (LCP) may need to implement a content-aware solution. For example, safeguarded copy (SGC) implements LCP for data stored in a distributed storage system, and may implement an identification of a logical data corruption event, as well as recovery from such an event.

Exemplary Objectives for Safeguarded Copy

In one aspect, safeguarded copy has the following exemplary objectives:
Allow creation of many recovery copies across multiple volumes or storage systems with optimized capacity usage and minimum performance impact.

Enable any previous recovery point to be made available on a set of recovery volumes while the production environment continues to run.

Secure the data for the safeguarded copies to prevent it from being accidentally or deliberately compromised.

Avoid use of distributed storage system device numbers and host device addresses.

Safeguarded copy may be distinct from a point in time full volume snapshot of data, which may provide an instantly accessible copy of a production volume, where each copy is independent from the others from a data perspective.

Exemplary Safeguarded Copy Operations

Figure 5:
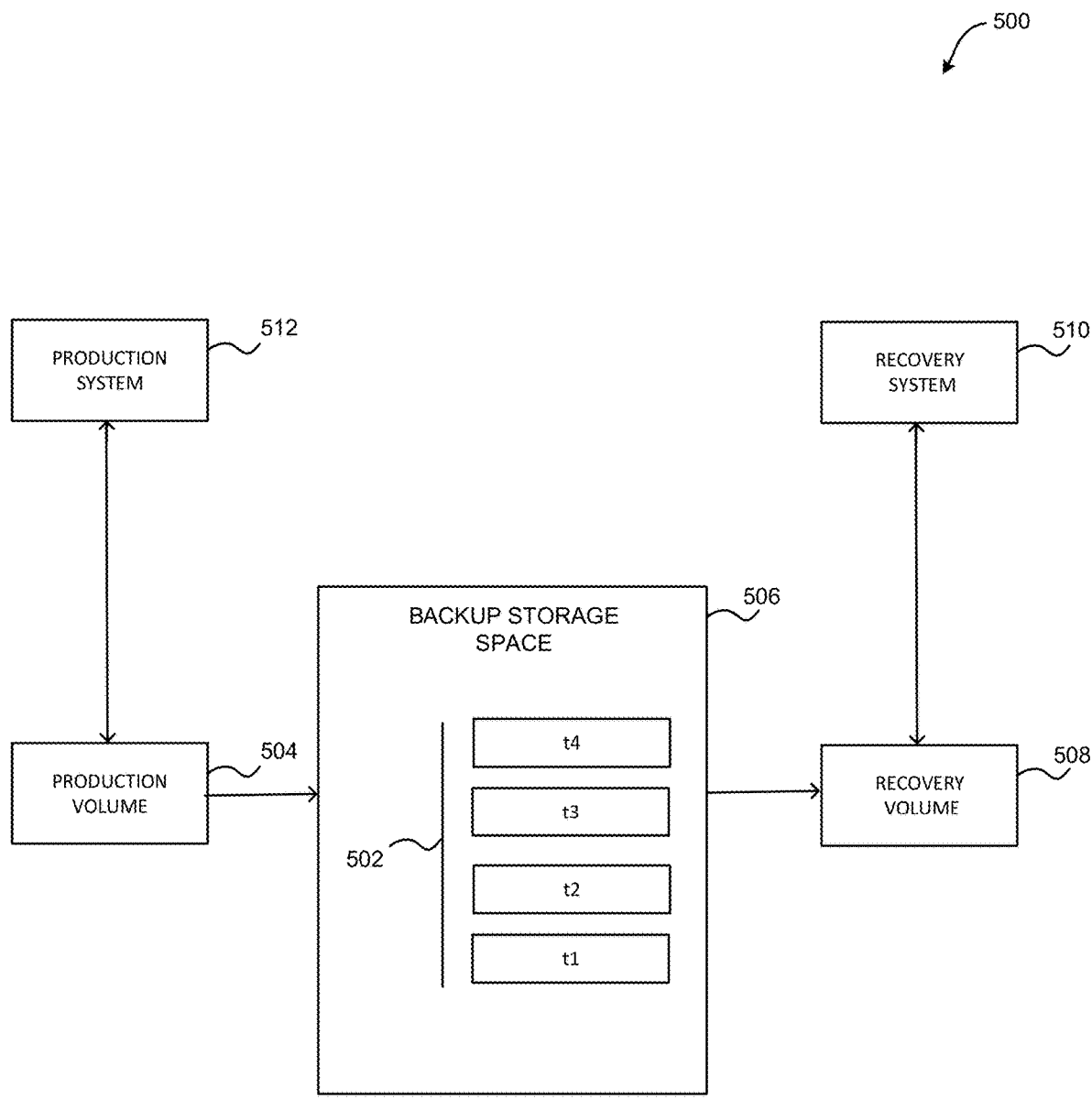
FIG. 5 illustrates an exemplary safeguarded backup configuration in accordance with one aspect of the present invention.

FIG. 5 illustrates an exemplary safeguarded backup configuration 500, according to one exemplary aspect. As shown, safeguarded copy provides functionality to create multiple recovery points 502 for a production volume 504 (e.g., a storage volume such as a source/safeguarded source). These recovery points 502 are called safeguarded Backups (e.g., backups/SG backups). In one aspect, the recovery data is not stored in separate regular volumes, but in a backup storage space 506 that is called a safeguarded backup capacity (SGBC). The backups are not directly accessible by a host. The data may only be used after a backup is recovered to a separate recovery volume 508.

When a recovery point 502 has been restored to the recovery volume 508, it may be accessed using a recovery system 510. This system may or may not be identical to a production system 512, depending on security requirements. Asynchronous data copying/mirroring may be used to restore the data from the recovery system 510 to a production volume 504. The production volume 504 may be located in the same, or in a different, distributed data storage system than the recovery volume 508.

A production environment may consist of hundreds or thousands of volumes 504 across one or more storage systems. An important aspect for logical corruption protection is to provide recovery points that are consistent across all volumes that are part of a backup. These recovery points are called consistency groups (CGs).

Exemplary Backup Management

Safeguarded copy backups may be protected against unintentional or intentional tampering. For example, a user may not create, delete, or recover manually using the distributed storage system management interfaces. An instance of a Copy Services Manager (CSM) may be used to perform these tasks. CSM may use a session concept to manage complete consistency groups.

Figure 6:
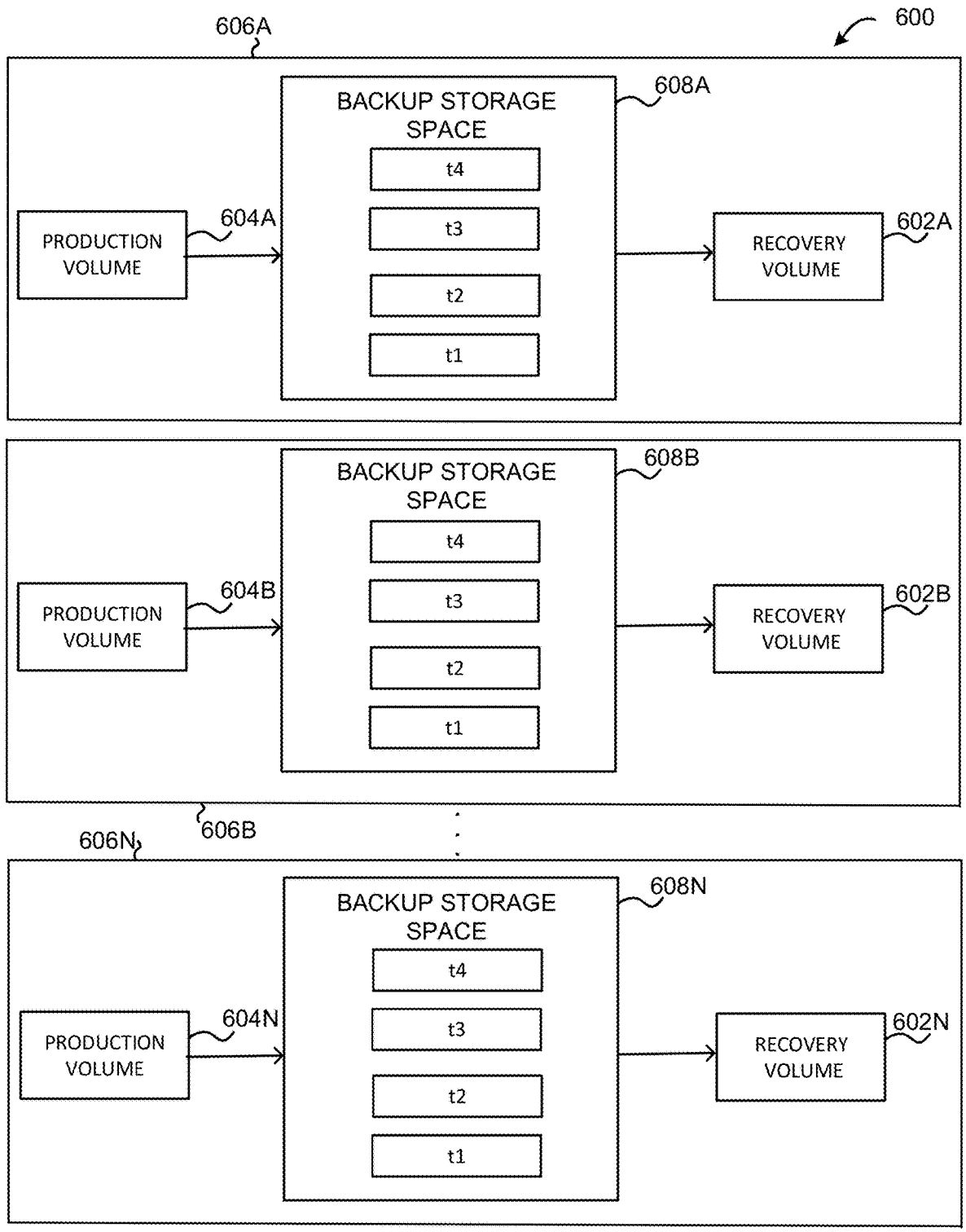
FIG. 6 illustrates an exemplary CSM safeguarded copy session in accordance with one aspect of the present invention.

FIG. 6 illustrates an exemplary CSM safeguarded copy session 600, according to one exemplary aspect. As shown, the session 600 includes a plurality of copy sets 606A-N. There is one copy set for each production volume to be backed up. Each of the plurality of copy sets 606A-N includes the production/source/storage volume 604A-N with an associated safeguarded backup capacity 608A-N (e.g., a backup storage space) and a recovery volume 602A-N. CSM performs actions, like backup and recovery, on the complete session 600. CSM may run these operations automatically using the built-in scheduler.

CSM also manages the lifecycle of backups. A retention period for backups may be specified, and CSM may automatically expire (remove) backups that are not required after the retention period. This may simplify and secure management, and may ensure that consistency is maintained across the session.

Exemplary Safeguarded Backup Capacity

Safeguarded backup capacity 608A-N may be thin provisioned. Small extents may be used for improved efficiency. Without any existing safeguarded backups, the safeguarded backup capacity is pure virtual capacity that is associated with the source volume. Physical storage space is allocated as backups are created, and data that is overwritten in the original volume is saved in the backup. Backup data is saved with track granularity.

A maximum amount of safeguarded backup capacity may be specified for each volume to be backed up. When the specified capacity has been reached, the oldest backups are removed automatically to free up space. As long as any safeguarded backups exist for a given volume, its associated safeguarded backup capacity may be prevented from being deleted. If a storage pool runs short on physical space, regardless of whether it is for backup or production data, the distributed storage system may send notifications according to the pool settings. Safeguarded backups may also be removed automatically by microcode if a storage pool used by safeguarded relations is determined to be running out of physical space (e.g., if an amount of available physical space becomes less than a threshold amount, etc.).

Exemplary Safeguarded Copy Backup

When a safeguarded copy backup is initiated, the distributed storage system creates a consistency group. It sets up metadata and bitmaps in order to track updates to the production volume. After the backup is set up, the distributed storage system copies data, that is to be overwritten by host I/O, from the production volume to a consistency group-logged location within the safeguarded backup capacity.

When the next backup is initiated, the distributed storage system may close the previous backup and may create a new consistency group. Therefore, the system may not have to maintain each backup individually. To restore to a certain recovery point, the distributed storage system needs all backups that are younger than the one to recover.

To minimize the impact of creating a consistency group, the safeguarded copy backup process may consist of three steps:

1. Reservation: In this step, the distributed storage system prepares to create a new safeguarded backup. The system sets up the required bitmaps and prepares the metadata in the safeguarded copy capacity. It also makes sure that all changed data from the previous backup is stored in its consistency group log. After all preparations are done, the actual consistency group formation can take place.

2. Check in: In order to create a consistency group, the distributed storage system has to stop all updates for all volumes within the CG for a short period. It does this by presenting an Extended Long Busy (ELB) state. When the data in cache is consistent, the previous consistency group logs of all affected volumes are closed, and therefore are also consistent. From now on, the distributed storage system will write further backup data into the consistency group logs of the new backup.

3. Completion: The distributed storage system lifts the ELB and write operations can continue. A copy services manager coordinates and performs these steps automatically and with minimum impact to the host operations.

Exemplary Safeguarded Copy Recovery

A user may recover any recovery point to a separate recovery volume. This volume must have at least the same capacity as the production volume, and can be thin provisioned. A user may perform the recovery with a background copy or without. A user may specify a no copy command if they need the recovered data only for a limited period of time, and a copy command if they intend to use it for a longer period of time. The user may initiate a safeguarded copy recovery through CSM.

Figure 7:
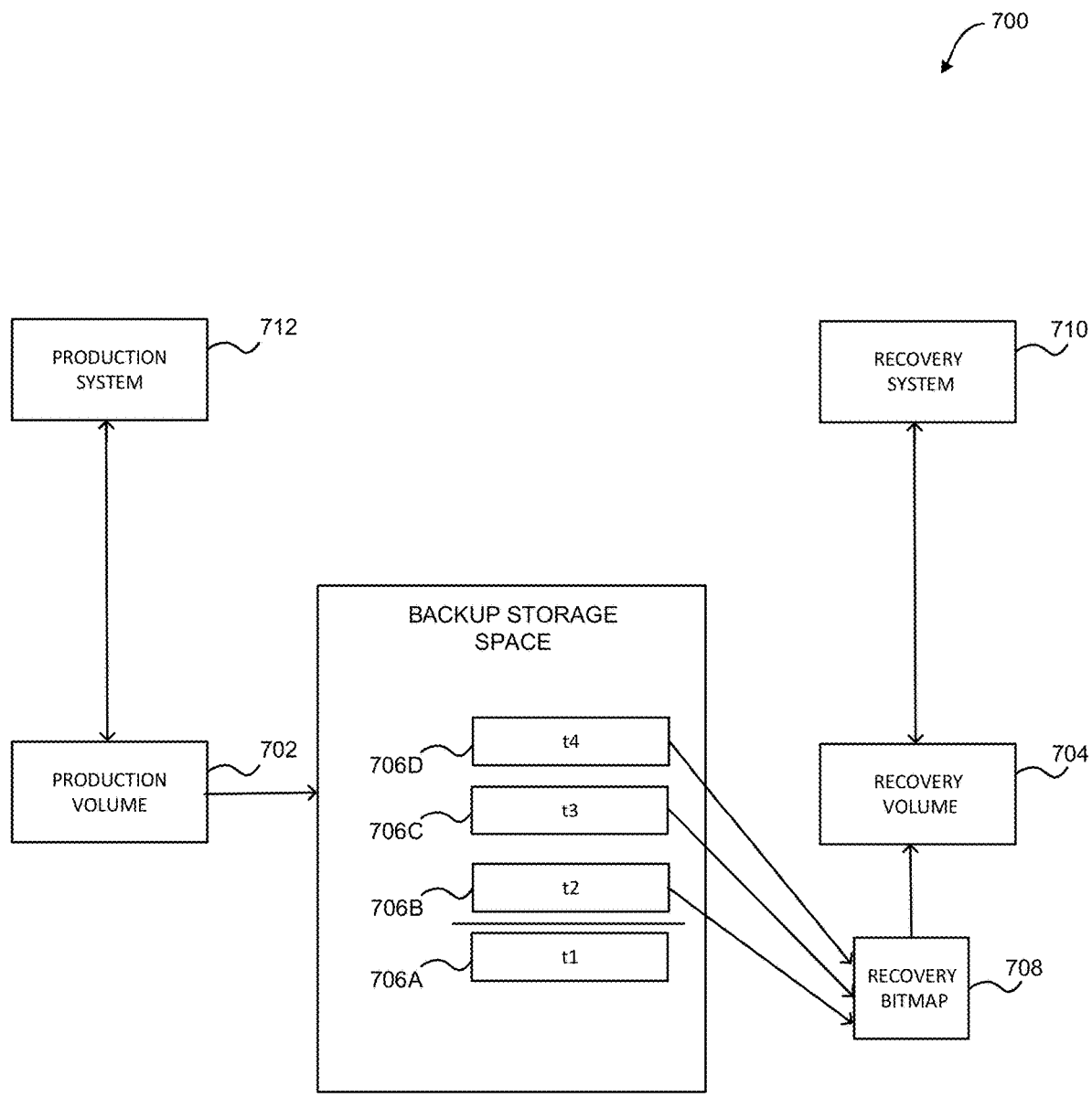
FIG. 7 illustrates an exemplary safeguarded copy configuration in accordance with one aspect of the present invention.

FIG. 7 illustrates an exemplary safeguarded copy configuration 700, according to one exemplary aspect. As shown, the safeguarded copy configuration 700 includes a production volume 702 (e.g., a storage volume), a recovery volume 704, and four safeguarded backups (e.g., consistency group logs t1 706A-t4 706D, with t4 being the most recent) representing four recovery points that are stored within a backup storage space. In one aspect, a recovery may be made to a point in time t2, with a no copy option. The recovery includes the following steps:

1. The distributed storage system establishes a point in time snapshot of data from the production volume 702 to the recovery volume 704. This makes the recovery volume 704 identical to the production volume 702.
2. The distributed storage system then creates a recovery bitmap 708 that indicates all data that was changed since time t2 and must be referenced from the consistency group logs t4 706D, t3 706C, and t2 706B, rather than from the production volume 702.

From this point, read and write access may be performed using the recovery volume 704. If a recovery system 710 reads data from the recovery volume 704, the distributed storage system examines the recovery bitmap 708 and decides whether it must fetch the requested data from the production volume 702 or from one of the consistency group logs t1 706A-t4 706D. In case the same track shows up in more than one backup, the system may use the "oldest" instance (the one closest to recovery point t2 706B).

If the recovery system 710 writes to the recovery volume 704, one of two cases may occur:

Full track write: the distributed storage system can write directly to the recovery volume 704 without considering existing data Partial track write: the distributed storage system has to fetch existing data first, according to the rules above, and then can apply the update.

If the recovery is performed with a background copy, the distributed storage system copies all data from the production volume 702 and the consistency group logs t1 706A-t4 706D to the recovery volume 704 in the background, following the same rules. You can access the recovery volume 704 at any time while the background copy is still running.

In cases where data is restored back to the original production volume 702, several choices are available:

Full volume restore: Global Copy may be used to replicate the data from the recovery volume 704 to the production volume 702. The production volume 702 can be on the same or a different distributed storage system as the recovery volume 704.

Selective restore: either the production volume 702 is made available to the recovery system 710, or the recovery volume 704 is made available to the production system 712. Then standard operating system or application methods may be used to copy needed data from the recovery volume 704 to the production volume 702.

Figure 8:
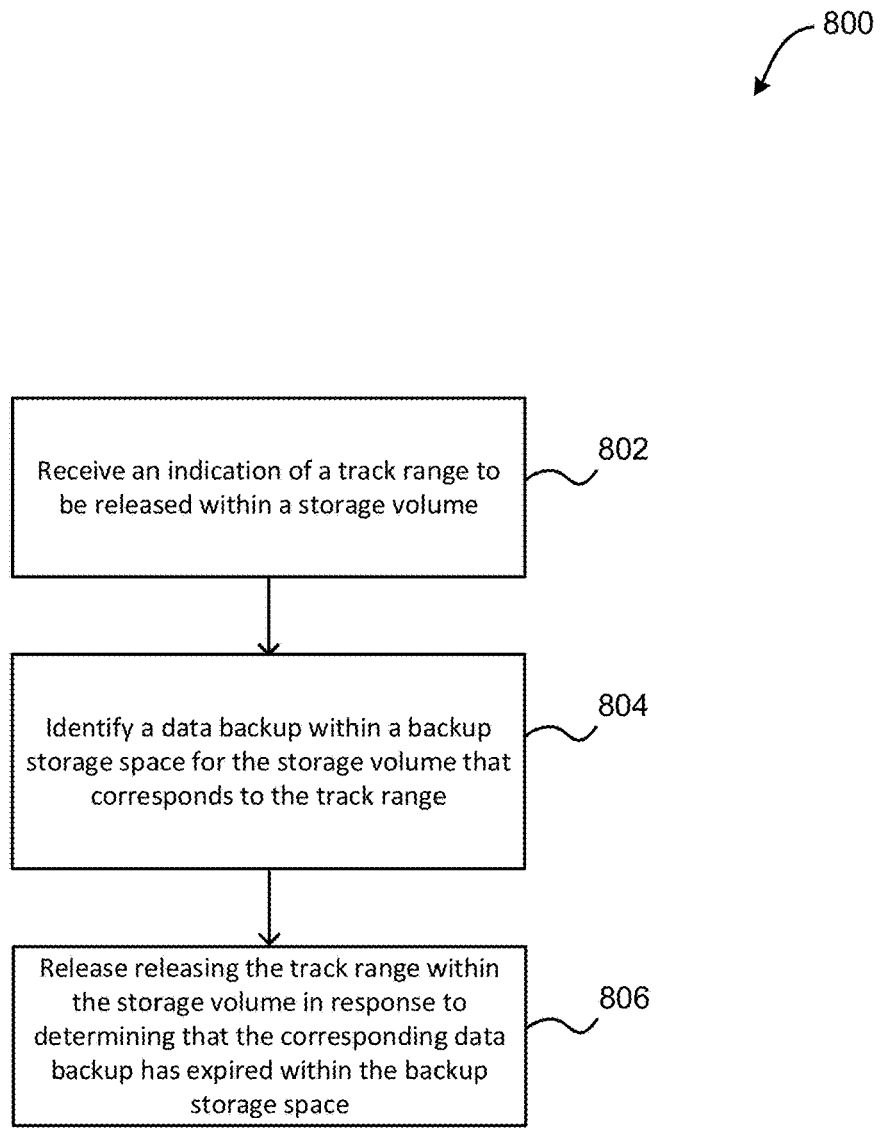
FIG. 8 illustrates a flowchart of a method for releasing data storage tracks while maintaining logical corruption protection, in accordance with one aspect of the present invention.

Now referring to FIG. 8, a flowchart of a method 800 is shown according to one aspect. The method 800 may be performed in accordance with the present invention in any of the environments depicted in FIGS. 1-7 and 9, among others, in various aspects. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various aspects, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where an indication of a track range to be released within a storage volume is received. In one aspect, the storage volume may be included within an interconnected storage system (e.g., a distributed data storage system, etc.). In another aspect, the storage volume may be included within a single device (e.g., within a single disk operating system (DOS), etc.). In yet another aspect, the storage volume may include one or more tangible storage drives.

Additionally, in one aspect, a backup storage space may be created as part of a logical corruption protection (LCP) implementation for data within the storage volume. For example, the LCP implementation may create data backups (e.g., recovery points) for the storage volume. In another example, each data backup may include a point-in-time snapshot of predetermined data within the storage volume. In yet another example, each data backup may be associated with a specific time/date that the snapshot was taken. In still another example, data backups may be created periodically according to a predetermined schedule.

Further, in one aspect, the LCP implementation may store the recovery points in the backup storage space, where the backup storage space is not accessible by a host utilizing the storage volume. In another aspect, in response to the occurrence of one or more errors within the storage volume, the recovery points may be restored to a recovery volume separate from the storage volume. In yet another aspect, the recovery volume may be accessed by a recovery system separate from a system that implements the storage volume. In still another aspect, data may then be restored from the recovery system to the storage volume.

Further still, in one aspect, the backup storage space may include data storage that is physically and/or logically separate from the storage volume. In another aspect, the backup storage space may be located within the same physical device as the storage volume. In yet another aspect, the backup storage space may be located within a different physical device from the storage volume.

Also, in one aspect, the backup storage space and the storage volume may both include physical data storage (e.g., one or more tangible data storage drives, etc.). In another aspect, the backup storage space may also be known as a backup capacity, a safeguarded backup capacity, etc. In yet another aspect, the storage volume may also be known as a host volume, a production volume, etc.

In addition, in one aspect, the indication of the track range to be released may be received from a space release utility. For example, the space release utility may be run on the storage volume to identify tracks of the storage volume that are not currently being used and that can be released for future data storage. In another example, the identified tracks may have write restrictions which prevent them from being written to in their current state. In yet another example, the space release utility may analyze the storage volume to determine data storage that is being used on the storage volume.

Furthermore, in one aspect, the space release utility may analyze a volume table that informs the utility where data sets are located within the storage volume. In another aspect, the space release utility may identify track ranges within the storage volume that do not have data sets stored on them, that are not allocated on any data set, etc. In yet another aspect, the space release utility may then issue a space release for the identified track ranges on the storage volume (via a disk operating system (DOS) host, etc.). In still another aspect, the space release may include a notification that the identified track ranges may be freed/released by the storage volume and used for future data storage.

Further still, in one aspect, a track range may include physical locations within a tangible data storage device. For example, each storage device may have multiple different hardware tracks, and a track range may indicate a predetermined portion of one or more of the hardware tracks used for storing data.

Also, in one aspect, the indication of the track range to be released within the storage volume may be received at a device that includes the storage volume, at one or more applications managing the storage volume, at the storage volume itself, etc. In another aspect, an indication of the track range to be released within the storage volume may be stored within a data structure (e.g., a bitmap such as a space release bitmap (SRBM), etc.).

In this way, track ranges may be released asynchronously (e.g., at a time later than the time the indication is received, etc.). Additionally, the entity that received the indication of the track range may create the data structure, and may store the indication of the track range within the data structure.

Additionally, method 800 may proceed with operation 804, where a data backup within a backup storage space for the storage volume is identified that corresponds to the track range. In one aspect, a data backup within the backup storage space may be identified as corresponding to the track range in response to determining that the data backup relies on one or more tracks within the track range in order to perform a data restoration for the storage volume (e.g., an LCP data restore, etc.).

Further, in one aspect, the track range may be identified as a safeguarded track range that have one or more corresponding data backups. In another aspect, in response to identifying the track range as safeguarded, the backup storage space may be searched for one or more corresponding data backups. In yet another aspect, if a plurality of data backups correspond to the track range, only the most recent corresponding backup may be identified as the corresponding data backup.

Further still, in one aspect, an identifier of the identified data backup may be stored in metadata within the storage volume and/or the system including the storage volume. For example, the identifier may include a microcode identifier, one or more sequence numbers, a generation number, a backup identifier, etc. In another aspect, the identifier may be stored in association with the track range. For example, the data structure storing the indication of the track range may point to the identifier (using one or more pointers, one or more association tables, etc.).

Also, in one aspect, a group of track ranges to be released within the storage volume may be received, where different subsets of the group may be associated with different data backups within the backup storage space. In another aspect, an indication of each of the different subsets of the group may be stored within its own separate data structure. In yet another aspect, each of the separate data structures may be individually associated with a different data backup within the backup storage space.

For example, a first data backup may correspond to a first bitmap that identifies a first subset of track ranges to be released. In another example, a second data backup different from the first backup may correspond to a second bitmap separate from the first bitmap that identifies a second subset of track ranges to be released that is different from the first subset of track ranges.

In addition, method 800 may proceed with operation 804, where the track range within the storage volume is released in response to determining that the corresponding data backup has expired within the backup storage space. In one aspect, data backups may be stored at extents within the backup storage space. For example, extents may include predetermined data storage locations within tangible data storage hardware used by the backup storage space. In another example, the extents may have a uniform, predetermined size, or the size of the extents may vary. In yet another example, the backup storage space may be represented as a series of adjacent extents in a predetermined order.

Furthermore, in one aspect, extents within the backup storage space may be filled according to a rolling buffer methodology. For example, after a current extent location is filled with a data backup (e.g., according to a data backup schedule, etc.), the next adjacent extent location in the predetermined order is selected. In another example, the rolling buffer methodology may dictate that, within the backup storage space, when the last extent location within the predetermined order is filled with a data backup, the first extent location in the predetermined order is selected as the next extent location to be filled. This may create a circular buffer within the backup storage space.

Further still, in one aspect, when an extent that already stores a data backup within the backup storage space is filled with a new data backup, the previously stored data backup expires/is removed, and the new data backup is stored in the extent location. In another aspect, an extent storing a data backup may also be manually expired by a user or application. In yet another aspect, when a data backup expires (e.g., due to its extent being filled with a new data backup or due to manual expiration), a notification is sent to a system that includes the storage volume (or to the storage volume itself).

Also, in one aspect, the system and/or the storage volume may set a periodic timer, and at the expiration of the periodic timer, the system and/or the storage volume may request a status of the corresponding data backup from the backup storage space. For example, the backup storage space may return the status indicating that the corresponding data backup has expired.

Additionally, in one aspect, in response to receiving the notification, a request to process the data structure storing the indication of the track range to be released within the storage volume may be sent to the system in which the storage volume is located, the storage volume itself, one or more applications managing the storage volume, etc. For example, processing the data structure (and thereby releasing the track range within the storage volume) includes freeing the associated track range within the storage volume so that the associated tracks within the track range may be used to store new data. In another example, freeing the tracks may include removing any write restrictions on the tracks so that the tracks may be written to.

Further, in one aspect, if the storage volume is synchronously mirrored, and is a primary storage volume, in response to determining that the corresponding data backup has expired within the backup storage space, a request to process the data structure storing the indication of the track range to be released within the storage volume may be sent to the storage volume as well as the mirrored storage volume (e.g., the secondary volume, etc.). In this way, synchronous mirroring of the release of the track range may be performed.

Further still, in one aspect, if the storage volume is synchronously mirrored, and is a secondary storage volume, in response to determining that the corresponding data backup has expired within the backup storage space, a request to process the data structure storing the indication of the track range to be released within the storage volume may be sent to the storage volume.

Also, in one aspect, if the storage volume is asynchronously mirrored with consistency, and is a primary storage volume, in response to determining that the corresponding data backup has expired within the backup storage space, a flag will be set to release the track range within the storage volume during a next increment. As the track range is released during the next increment, a request may then be sent to a mirrored volume (e.g., the secondary volume) to release the same track range at the mirrored volume.

In addition, in one aspect, if the storage volume is asynchronously mirrored with consistency, and is a primary storage volume, in response to determining that the corresponding data backup has expired within the backup storage space, a flag will be set to release the track range within the storage volume during a next increment. As the track range is released during the next increment, a request may then be sent to a mirrored volume (e.g., the secondary volume) to release the same track range at the mirrored volume.

Furthermore, in one aspect, if the storage volume is asynchronously mirrored with consistency, and is a secondary storage volume, in response to determining that the corresponding data backup has expired within the backup storage space, a flag will be set to note that such expiration has occurred.

Further still, in one aspect, all of the above operations may be performed by one or more of a tangible system including the storage volume, by the storage volume itself, or by a system separate from the storage volume.

In this way, data scheduled for removal from a storage volume via a track release from the storage volume may only be removed when all backups that rely on that data have expired within the backup storage space. This may ensure that all backups within the backup storage space have all associated data available within the storage volume to perform a data restoration if necessary. This may maintain a security of data within the storage volume according to an LCP implementation.

Additionally, by ensuring that LCP is implemented for the storage volume during track range release, the storage volume may be protected from logical corruption, which may improve a performance of the storage volume itself.

Further, freeing up extents within the storage volume may reduce an amount of used space within the storage volume, which may improve a performance of the storage volume (e.g., if the storage volume is thin provisioned, etc.).

Figure 9:
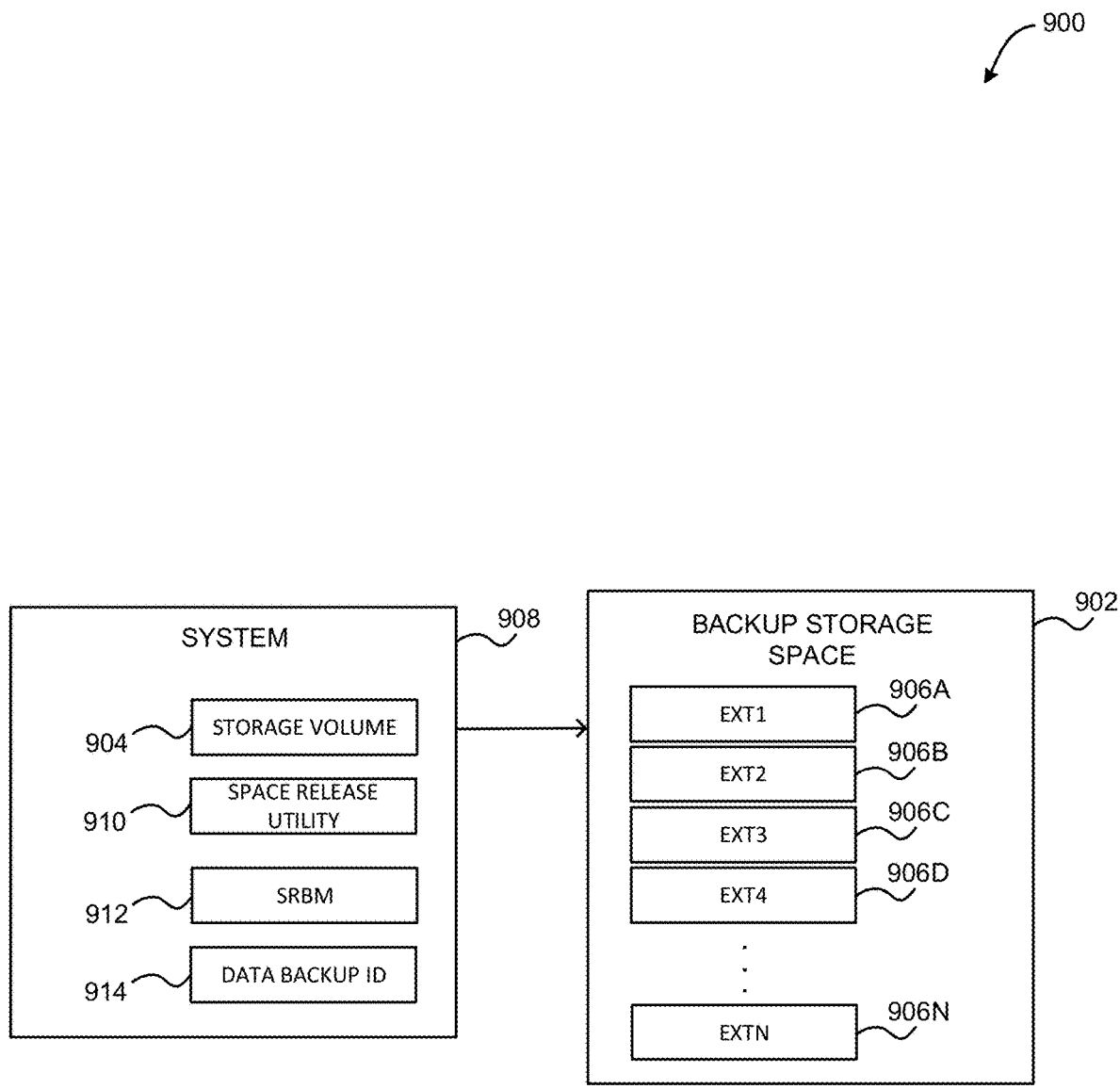
FIG. 9 illustrates an exemplary logical corruption protection storage environment, in accordance with one aspect of the present invention.

FIG. 9 illustrates an exemplary logical corruption protection storage environment 900, according to one exemplary aspect. As shown, a backup storage space 902 provides backup storage for a storage volume 904 of a system 908. For example, the backup storage space 902 may be created as part of a logical corruption protection (LCP) implementation for data within the storage volume 904.

Additionally, on a periodic basis, a data backup may be created for the storage volume 904 and may be stored in one of the extents 906A-N of the backup storage space 902. The extents 906A-N may be in a predetermined order from a first original extent 906A to a last original extent 906N, and may be filled according to a rolling buffer methodology. For example, after a first extent 906A is filled with a data backup (e.g., according to a backup schedule, etc.), the next adjacent original extent 906B is selected to be filled according to the predetermined order.

Further, the rolling buffer methodology may dictate that, within the backup storage space 902, after the last original extent 906N within the predetermined order is filled with a data backup, the first original extent 906A in the predetermined order is selected as the next extent location to be filled.

Also, a space release utility 910 may be run on the storage volume 904 to identify tracks of the storage volume 904 that are not currently being used and that can be released for future data storage. These identified tracks are stored within the system 908 as a space release bitmap (SRBM) 912.

Additionally, a data backup 906C within the backup storage space 902 may be identified as corresponding to the bitmap of the received SRBM 912 in response to determining that the data backup 906C relies on one or more tracks within the received SRBM 912 in order to perform a data restoration for the storage volume 904. An identifier of the identified data backup 906C is stored as metadata 914 within the system 908.

Further, in response to determining that the identified data backup 906C is still stored within the backup storage space 902, the received SRBM 912 may remain unreleased within the storage volume 904. However, in response to determining that the identified data backup 906C has expired within the backup storage space 902, a request to process the SRBM 912 may be sent to the storage volume 904. Processing the SRBM 912 releases the track range within the storage volume 904 by freeing the associated track range within the storage volume 904 so that the associated tracks within the track range may be used to store new data.

Space Release for Safeguarded Volumes

In one aspect, safeguarded volumes may allow and manage release space requests from a host.

When a valid release space command is issued to a Safeguarded device (e.g., a device implementing Safeguarded Copy (SGC)), a generation number will be stored both in Safeguarded and Release Space code to indicate a current Safeguarded Consistency Group (CG) at the time the release space command was received. Space will not be released immediately, but a space release bitmap (SRBM) will be allocated to indicate which track ranges are to be released. While in the current CG, the same SRBM will be used to accept and record the scope of subsequent release space commands.

Once a new CG is formed, the SRBM allocated for the original CG will no longer track new release space commands.

Once the original CG is rolled off, SGC will call for the SRBM to be processed and allow space to be released. A Safeguarded volume running Metro Mirror, Global Copy, and/or Global Mirror is also supported.

When a space release request is received on a Safeguarded Source Volume, a check will be made to verify if the current backup can accept the request. Assuming it accepts the requests, a space release bitmap (SRBM) will be allocated and a Generation Number will be stored representing the current backup/CG. SGC will also store this Generation Number, representing the SRBM for the CG. As new requests come in, they will be accepted for as long as the backup (associated with the SRBM) is active. Once a new CG is formed, the SRBM will no longer accept updates. A new SRBM will be created and used to track requests for the new CG. Once the backup/CG is rolled off, a call will be made for the SRBM to be processed and space release to begin.

Handling for PPRC and Global Mirror (GM) is also supported and described below:

Metro Mirror/Global Copy Primary Handling: When a CG is rolled off, if there is an associated SRBM, a call will be made for the bitmap to be processed and space to be released. As space is released on the primary, commands will be sent to the secondary requesting for the same space to be released.

Metro Mirror/Global Copy Secondary Handling: When a CG is rolled off, if there is an associated SRBM, a call will be made for the bitmap to be processed and space to be released.

Global Mirror Primary: When a CG is rolled off, if there is an associated SRBM, a call will be made for the bitmap to be processed. Space will not be released but a flag will be set indicating that space can be released on GM's next 'Increment Complete'. As space is released on the primary (during Increment Complete), requests will be sent to the secondary requesting for the same space to be released.

Global Mirror Secondary: When a CG is rolled off, SGC will not call to release space; instead, a flag indicating the rolloff occurred will be set. During GM Withdraw Commit a check will be made to determine if the CG associated with the SRBM has rolled off. Withdraw Commit will call for SRBM to be processed once SGC indicates the associated CG has been rolled off.

In one aspect, a method is provided for managing release space requests for safeguarded volumes, the method including, upon receiving a valid release space command for a safeguarded device, storing a generation number indicating the current safeguarded consistency group (CG) at the time the release space command was received. Additionally, the method includes allocating a space release bitmap (SRBM) to indicate which track ranges are to be released.

Further, the method includes, for a current consistency group, using the same SRBM to accept subsequent release space commands. Further still, the method includes, for a new consistency group, ceasing to track new release space commands with the SRBM allocated for the original consistency group. Also, the method includes, in response to terminating the original consistency group, calling for the SRBM to be processed and allowing the space to be released.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method, comprising:
receiving an indication of a track range to be released within a storage volume;
identifying a data backup within a backup storage space for the storage volume that corresponds to the track range; and
releasing the track range within the storage volume in response to determining that the corresponding data backup has expired within the backup storage space.

2. The computer-implemented method of claim 1, wherein the backup storage space is created as part of a logical corruption protection (LCP) implementation for data within the storage volume.

3. The computer-implemented method of claim 1, wherein the indication of the track range to be released is received from a space release utility.

4. The computer-implemented method of claim 1, wherein an indication of the track range to be released within the storage volume is stored within a space release bitmap (SRBM).

5. The computer-implemented method of claim 1, wherein a data backup within the backup storage space is identified as corresponding to the track range in response to determining that the data backup relies on one or more tracks within the track range in order to perform a data restoration for the storage volume.

6. The computer-implemented method of claim 1, wherein in response to determining that a plurality of data backups correspond to the track range, only the most recent corresponding backup is identified as the corresponding data backup.

7. The computer-implemented method of claim 1, wherein an identifier of the corresponding data backup is stored in metadata within the storage volume.

8. The computer-implemented method of claim 1, wherein:
a group of track ranges to be released within the storage volume is received, where different subsets of the group are associated with different data backups within the backup storage space,
an indication of each of the different subsets of the group is stored within its own separate data structure, and
each of the separate data structures is individually associated with a different data backup within the backup storage space.

9. The computer-implemented method of claim 1, wherein data backups are stored at extents within the backup storage space, and extents within the backup storage space are filled according to a rolling buffer methodology.

10. The computer-implemented method of claim 1, wherein the storage volume sets a periodic timer, and at the expiration of the periodic timer, the storage volume requests a status of the corresponding data backup from the backup storage space.

11. The computer-implemented method of claim 1, wherein:
in response to determining that a data backup has expired, a notification is sent to a system that includes the storage volume, and
in response to receiving the notification, a request to process a data structure storing the indication of the track range to be released within the storage volume is sent to the storage volume.

12. The computer-implemented method of claim 1, wherein the backup storage space includes data storage that is physically separate from the storage volume.

13. A computer program product for releasing data storage tracks while maintaining logical corruption protection, the computer program product comprising a computer readable storage medium having program instructions embodied therewith, wherein the computer readable storage medium is not a transitory signal per se, the program instructions executable by a processor to cause the processor to perform a method comprising:
receiving, by the processor, an indication of a track range to be released within a storage volume;
identifying, by the processor, a data backup within a backup storage space for the storage volume that corresponds to the track range; and
releasing, by the processor, the track range within the storage volume in response to determining that the corresponding data backup has expired within the backup storage space.

14. The computer program product of claim 13, wherein the backup storage space is created as part of a logical corruption protection (LCP) implementation for data within the storage volume.

15. The computer program product of claim 13, wherein the indication of the track range to be released is received from a space release utility.

16. The computer program product of claim 13, wherein an indication of the track range to be released within the storage volume is stored within a space release bitmap (SRBM).

17. The computer program product of claim 13, wherein a data backup within the backup storage space is identified as corresponding to the track range in response to determining that the data backup relies on one or more tracks within the track range in order to perform a data restoration for the storage volume.

18. The computer program product of claim 13, wherein in response to determining that a plurality of data backups correspond to the track range, only the most recent corresponding backup is identified as the corresponding data backup.

19. The computer program product of claim 13, wherein an identifier of the data backup is stored in metadata within the storage volume.

20. The computer program product of claim 13, wherein:
a group of track ranges to be released within the storage volume is received, where different subsets of the group are associated with different data backups within the backup storage space,
an indication of each of the different subsets of the group is stored within its own separate data structure, and
each of the separate data structures is individually associated with a different data backup within the backup storage space.

21. The computer program product of claim 13, wherein data backups are stored at extents within the backup storage space, and extents within the backup storage space are filled according to a rolling buffer methodology.

22. The computer program product of claim 13, wherein the storage volume sets a periodic timer, and at the expiration of the periodic timer, the storage volume requests a status of the corresponding data backup from the backup storage space.

23. A system, comprising:
a processor; and
logic integrated with the processor, executable by the processor, or integrated with and executable by the processor, the logic being configured to:
receive an indication of a track range to be released within a storage volume;
identify a data backup within a backup storage space for the storage volume that corresponds to the track range; and
release the track range within the storage volume in response to determining that the corresponding data backup has expired within the backup storage space.

24. A computer-implemented method, comprising:
receiving an indication of a track range to be released within a storage volume;
storing an indication of the track range to be released within the storage volume within a space release bitmap (SRBM);
identifying a data backup within a backup storage space for the storage volume that corresponds to the track range in response to determining that the data backup relies on one or more tracks within the track range in order to perform a data restoration for the storage volume; and
releasing the track range within the storage volume in response to receiving an indication from the backup storage space that the corresponding data backup has expired within the backup storage space.

25. A computer program product for releasing data storage tracks while maintaining logical corruption protection, the computer program product comprising a computer readable storage medium having program instructions embodied therewith, wherein the computer readable storage medium is not a transitory signal per se, the program instructions executable by a processor to cause the processor to perform a method comprising:
receiving, by the processor, an indication of a track range to be released within a storage volume;

storing, by the processor, an indication of the track range to be released within the storage volume within a space release bitmap (SRBM);

identifying, by the processor, a data backup within a backup storage space for the storage volume that corresponds to the track range in response to determining that the data backup relies on one or more tracks within the track range in order to perform a data restoration for the storage volume; and releasing, by the processor, the track range within the storage volume in response to receiving an indication from the backup storage space that the corresponding data backup has expired within the backup storage space.

* * * * *